Oct. 13, 1953     O. E. IHLE ET AL     2,655,011
COMBINED CONTAINER AND DISPENSER FOR LIQUIDS

Original Filed Dec. 6, 1948

INVENTORS.
ORDEN E. IHLE
EDWIN J. KAPTEYN
BY THEIR ATTORNEYS.
HARRIS, KIECH, FOSTER & HARRIS

Patented Oct. 13, 1953

2,655,011

UNITED STATES PATENT OFFICE 2,655,011

COMBINED CONTAINER AND DISPENSER FOR LIQUIDS

Orden E. Ihle, Glendale, and Edwin J. Kapteyn, Los Angeles, Calif., assignors to said Ihle, doing business as Ihle Manufacturing Company, Glendale, Calif.

Original application December 6, 1948, Serial No. 63,814, now Patent No. 2,559,877, dated July 10, 1951. Divided and this application April 30, 1951, Serial No. 223,704

4 Claims. (Cl. 62—149)

This application, which is a division of our copending application Serial No. 63,814, filed December 6, 1948, now Patent No. 2,559,877, issued July 10, 1951, for Combined Container and Dispenser for Liquids, relates to a device for containing, agitating, and dispensing cooled soft drinks such as fruit juices.

It is an important object of this invention to provide a liquid container and dispenser which includes magnetically driven agitator means within the container for continuously agitating the fruit juice or other liquid to maintain the consistency of the dispensed juice substantially uniform. A related object is to provide an agitator disc rotatable within the container and provided with a permanent magnet, and a driving means outside of the container, also provided with a permanent magnet, by means of which rotation of the agitator disc is effected without mechanical connection thereof to the driving means.

Further objects of the invention will appear from the following description of the device and from the drawing, which is for the purpose of illustration only, and in which.

Figure 2:
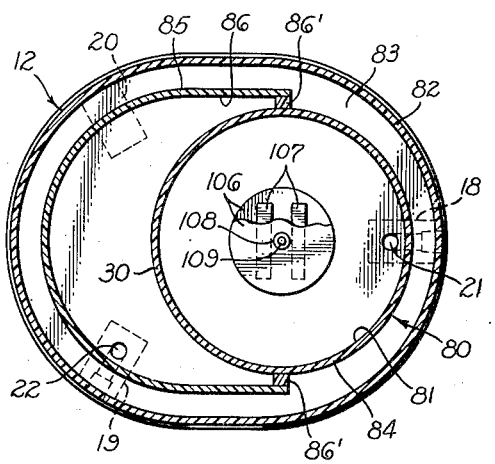
Fig. 2 is a cross-sectional view, taken on line 2—2 of Fig. 1.
Figure 3:
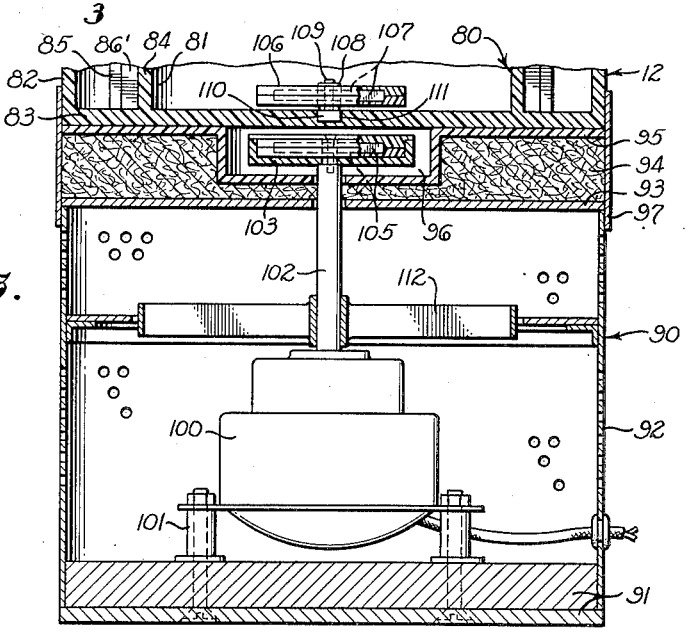
Fig. 3 is a vertical sectional view of the lower portion of the liquid dispensing device, taken on line 3—3 of Fig. 1.

Referring to the drawing, there is shown a receptacle 12 including a receptacle member 80 enclosed by a shell 82, the member and shell having a common bottom wall 83. As shown in Fig. 2, the receptacle member 80 includes a tubular element 84, which defines a juice compartment 81, and a U-shaped element 85 which defines with said tubular element an ice compartment 86 of substantially crescent-shaped outline. Spacer elements 86' are interposed between the end portions of the sides of the U-shaped element 85 and the periphery of the element 84 so as to avoid sharp angular crevices in which foreign matter might lodge.

The receptacle member 80 is supported by a base member 90 which consists of a two-part bottom plate 91 to the periphery of which is secured a perforated metal tube 92. A plate 93 of fiberboard rests upon the upper end of the tube 92 and supports a layer 94 of insulating material, such as foam plastic material. Resting upon the layer 94 is a plastic top plate 95 having walls defining a well 96. A metal band 97 surrounds the upper end of the base 90 and extends above the top thereof to enclose the lower end of the receptacle member 80 which is supported by the plate 95.

Figure 1:
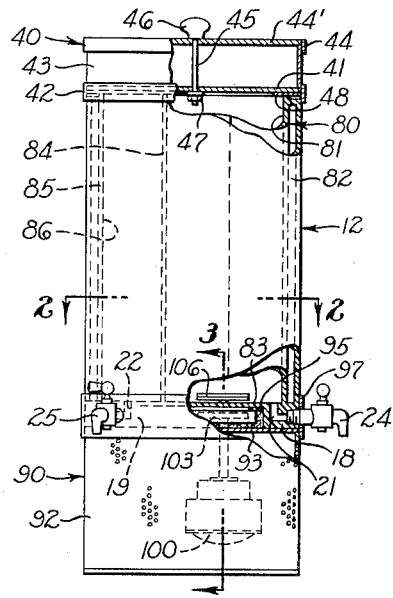
Fig. 1 is a side elevational view of a liquid dispensing device constructed in accordance with the present invention, certain portions of the device being broken away to reveal the internal structure.

As shown in Figs. 1 and 2, a plurality of plastic blocks 18, 19, and 20 is joined to the bottom wall 83 and serve as feet which rest upon the support plate 93 within the confines of the band 97. The blocks 18 and 19 are provided with angular passages or discharge ports 21 and 22, respectively, these ports communicating with the interior of the receptacle member 80. Faucets or petcocks 24 and 25 have threaded stems passing through holes in the band 97 and screwed into the outer threaded ends of the respective ports 21 and 22, these faucets being employed for controlling the flow of liquid from the receptacle member 80.

The receptacle member 80 is provided with a septum or partition 30 which divides the interior of the member into the two compartments or containers 81 and 86. As shown in Fig. 2, the partition 30 is substantially semicircular in cross section so that the container 81 is made cylindrical. The other container, 86, which serves to hold a quantity of ice or ice water, is substantially crescent shape in plan view. The temperature of the fruit juice or other beverage in the container 81 is effectively cooled through the partition 30 which serves as a heat transferer and which is maintained cool by the ice or ice water within the container 86. The partition 30 has a relatively large surface area so that a very effective cooling of the liquid in the container 81 is produced.

The liquid dispensing device also includes a closure member or cover 40 for closing the upper end of the receptacle member 80. The cover 40 may comprise a substantially elliptical lower plate 41 made from pressed wood fibers or the like, and a stainless steel band 42 which surrounds the edge of the plate, the plate being forced into the band and retained therein by a suitable adhesive or by any other means. Nested within the upper projecting end of the band 42 and resting upon the plate 41 is a tube 43 which carries a stainless steel band 44 at its upper end. The cover 40 also has a second plate 44', similar to the plate 41, which rests upon the upper end of the tube 43 within the band 44.

The several components of the cover 40 described above may be held in assembled relationship by means of a bolt 45 passing through aligned holes in the plates 44' and 41. The bolt 45 has a knob-like head 46 which abuts the plate 44', and a nut 47 screwed onto the lower threaded end of the bolt and set up against the plate 41 draws the several parts together. A sheet 48 of cork or other material having a low coefficient of heat conductivity is preferably cemented to the bottom surface of the plate 41, the sheet being adapted to seal the upper end of the receptacle member 80 when the cover 40 is in place thereon.

To fill the container 81 with fruit juice or other soft drinks, it is necessary to merely remove the cover 40, by means of the knob 46, after which the liquid refreshment can be poured into the container and the cover again placed on the receptacle member. In a like manner, a supply of crushed ice can be conveniently placed in the compartment 86.

To dispense the fruit juice from the container 81, a glass is held beneath the spout of the faucet 24 and the faucet opened to permit flow of the liquid through the port 21. It is also desirable to drain water from the ice compartment 86, and this is accomplished by opening the petcock 25 to allow flow of the water through the port 22.

When certain liquids such as orange juice are to be dispensed, it is highly desirable that the liquid be continuously agitated so as to prevent settling of the fruit pulp in the bottom of the container 81. In the present device, such agitation is produced by an electric motor 100 which is supported by mounting means 101 on the bottom plate 91 and has an upwardly projecting shaft 102 which extends into the well 96. The upper reduced end of the motor shaft 102 carries a plastic disc 103 in which is held a pair of permanent magnet bars 105. Disposed above the rotatable disc 103, within the juice compartment 81, is a similar disc 106 which also has a pair of permanent magnet bars 107. The disc 106 has an axial bushing 108 which is rotatable on a vertical stud or pin 109. The pin 109 has a head 110 seated in a recess 111 in the upper surface of the bottom plate 83 at the center of the juice compartment 81. Adjacent the motor 100, the shaft 102 carries a fan 112 for circulating air through the base 90 for the purpose of maintaining the motor cool.

During operation of the motor 100, the shaft 102 and disc 103 carried thereby are rotated at a relatively high rate of speed. Due to the magnetic fields set up between the permanent magnets 105 and 107 of the respective discs 103 and 106, the disc 106 is caused to rotate at the same speed as the disc 103. The frictional engagement of the disc 106 with the juice within the compartment 81 causes a swirling agitation of the juice so that the fruit pulp of the juice is held in suspension and prevented from settling to the bottom of the juice compartment.

While we have herein shown and described the liquid dispensing device as embodied in an exemplary form, it is obvious that various modifications might be made therein without departing from the spirit of the invention. Consequently, we do not wish to be limited in this respect, but desire to be afforded the full scope of the appended claims.

We claim as our invention:

1. A liquid containing and dispensing device, comprising: a receptacle adapted to contain and dispense a liquid therefrom; a refrigerant container adapted to store a refrigerant in heat transfer relation with said liquid within said receptacle; an agitator disc rotatable within said receptacle and provided with at least one permanent magnet bar extending chordally thereof; a driving disc spaced from and disposed coaxially with said agitator disc outside of said receptacle, said driving disc having at least one permanent magnet bar extending chordally thereof, said driving disc magnet and said agitator disc magnet providing a magnetic flux extending between said discs to effect rotation of said agitator disc within said receptacle when said driving disc is rotated outside of said receptacle; and power means disposed outside of said receptacle for rotating said driving disc.

2. A liquid containing and dispensing device for storing and dispensing a liquid containing solid particles in suspension therein, comprising: a receptacle member having an open top and closed bottom; thermoconductive partition means within said receptacle member dividing the interior thereof into at least two compartments, at least one of said compartments being adapted to contain said liquid and at least one other of said compartments being adapted to contain a cooling agent for cooling said liquid during storage thereof; a magnetically driven agitator rotatable within said liquid containing compartment adapted to agitate said liquid to prevent settling out of said solid particles; power means disposed outside of said receptacle member for rotating said agitator means; and magnetic coupling means coupling said power means and said agitator.

3. A liquid dispensing device as defined in claim 2 in which said agitator includes an agitator disc mounted within said liquid containing compartment adjacent the bottom of the receptacle member, said agitator disc being provided with at least one permanent magnet bar extending chordally thereof, and in which said power means includes an electric motor disposed beneath the bottom of the receptacle member, said motor having an upwardly projecting shaft carrying a driving disc mounted outside of the receptacle member adjacent the bottom thereof and coaxially with said agitator disc, said driving disc having at least one permanent magnet bar extending chordally thereof.

4. A liquid containing and dispensing device for storing and dispensing a liquid containing solids in suspension therein, comprising: a receptacle member having an open top and closed bottom; thermoconductive partition means within said receptacle member dividing the interior thereof into at least two compartments, at least one of said compartments being adapted to contain said liquid and at least one other of said compartments being adapted to contain a cooling agent for cooling said liquid during storage thereof; a pair of rotatable discs, each provided with a permanent magnet, one of said discs being mounted for rotation within the liquid containing compartment adjacent the bottom of the receptacle member and the other of said discs being mounted for rotation outside of said compartment adjacent the bottom of the receptacle member; driving means disposed outside of said receptacle member for rotating said discs; and thermal insulating means disposed between the bottom of the receptacle member and said driving means.

ORDEN E. IHLE.
EDWIN J. KAPTEYN.

References Cited in the file of this patent

UNITED STATES PATENTS

| Number | Name | Date |
|---|---|---|
| 2,289,645 | Geistert | July 14, 1942 |
| 2,459,224 | Hendricks | Jan. 18, 1949 |
| 2,466,468 | Neal | Apr. 5, 1949 |
| 2,521,406 | Pinto | Sept. 5, 1950 |